(12) United States Patent
Luchini et al.

(10) Patent No.: US 6,998,496 B2
(45) Date of Patent: *Feb. 14, 2006

(54) RUMEN BYPASS CALCIUM SALTS OF TRANS AND POLYUNSATURATED FATTY ACIDS

(75) Inventors: Nestor Daniel Luchini, Naperville, IL (US); George K. Strohmaier, Medina, OH (US); Eiler D. Frederiksen, Henderson, NV (US)

(73) Assignee: Virtus Nutrition LLC, Fairlawn, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 10/840,494

(22) Filed: May 6, 2004

(65) Prior Publication Data

US 2004/0225144 A1    Nov. 11, 2004

Related U.S. Application Data

(63) Continuation-in-part of application No. 10/431,318, filed on May 6, 2003, now Pat. No. 6,924,382.

(60) Provisional application No. 60/486,003, filed on Jul. 9, 2003.

(51) Int. Cl.
*C07C 51/00* (2006.01)

(52) U.S. Cl. .................. 554/156; 426/807; 514/558

(58) Field of Classification Search ............... 554/156; 426/807; 514/558
See application file for complete search history.

(56) References Cited

U.S. PATENT DOCUMENTS

| | | | |
|---|---|---|---|
| 4,642,317 A | 2/1987 | Palmquist et al. | 514/558 |
| 4,826,694 A | 5/1989 | McAskie | 426/74 |
| 4,853,233 A | 8/1989 | McAskie | 426/74 |
| 4,909,138 A | 3/1990 | McAskie | 99/536 |
| 5,004,728 A | 4/1991 | Chalupa et al. | 514/12 |
| 5,143,737 A | 9/1992 | Richardson | 426/2 |
| 5,250,307 A | 10/1993 | Cummings et al. | 426/72 |
| 5,382,678 A | 1/1995 | Vinci et al. | |
| 5,416,115 A | 5/1995 | Erdman et al. | 514/560 |
| 6,229,031 B1 | 5/2001 | Strohmaier et al. | |
| 6,392,075 B1 | 5/2002 | Strohmaier et al. | 554/156 |
| 6,559,324 B2 * | 5/2003 | Strohmaier et al. | 554/156 |
| 2002/0176883 A1 | 11/2002 | Block et al. | |
| 2003/0039681 A1 | 2/2003 | Block et al. | |

FOREIGN PATENT DOCUMENTS

| | | |
|---|---|---|
| EP | 1304369 | 4/2003 |
| JP | 8336360 | 12/1996 |
| WO | 02/00034 | 3/2002 |
| WO | WO 02/26666 A2 | 4/2002 |

* cited by examiner

*Primary Examiner*—Deborah D. Carr
(74) *Attorney, Agent, or Firm*—Synnestvedt & Lechner LLP

(57) ABSTRACT

Free-flowing unsaturated fatty acid calcium salts with a fatty acid content consisting essentially of (a) about 40 to about 95 wt % unsaturated C16–C22 fatty acids; (b) about 5 to about 60 wt % saturated C14–C22 fatty acids; and (c) no more than about 6 wt % moisture, insolubles and unsaponifiables; with no more than about 20 wt % in the form of glycerides; wherein about 40 to about 65 wt % of total product weight is of trans fatty acids and one or more fatty acids selected from C18:2 and C18:3 fatty acids and C20–C22 omega-3 and omega-6 fatty acids. Products with about 10 to about 65 wt % of total product weight of CLA's and one or more fatty acids selected from non-conjugated C18:2 and C18:3 fatty acids and C20–C22 omega-3 and omega-6 fatty acids are also disclosed.

21 Claims, No Drawings

RUMEN BYPASS CALCIUM SALTS OF TRANS AND POLYUNSATURATED FATTY ACIDS

CROSS-REFERENCE TO RELATED APPLICATIONS

The present application is a Continuation-In-Part of U.S. patent application Ser. No. 10/431,318 filed May 6, 2003 now U.S. Pat. No 6,924,382. This application also claims priority benefit under 35 U.S.C. §119(e) of U.S. Provisional Application No. 60/486,003 filed Jul. 9, 2003. The disclosures of both applications are incorporated herein by reference.

BACKGROUND OF THE INVENTION

The present invention relates to calcium salts of unsaturated fatty acids that are of particular interest as nutritional supplements.

Unsaturated fatty acids undergo hydrogenation to saturated fatty acids by microbial action in the rumen and must be fed to ruminants in a protected form. U.S. Pat. No. 5,143,737 discloses the encapsulation of unsaturated fatty acids with non-toxic organic materials to protect the unsaturated fatty acids from microbial action in the rumen. The most familiar form in which fatty acids in general are protected from microbial action in the rumen are the fatty acid calcium salts disclosed by U.S. Pat. Nos. 4,642,317; 4,826,694; 4,853,233 and 4,909,138. This form of fatty acid protection is widely accepted in the dairy and beef cattle industries.

Unsaturated fatty acids, however, do not readily react to form calcium salts using the processes disclosed by the above-listed patents. Instead of forming free-flowing granules, a mass develops that hardens into a tough material that resists grinding into the fine particles required for consumption by cattle. The resulting material also lacks storage stability. The product tends to auto-oxidize through an exothermic reaction that leads to a congealing of the product mass from its free flowing granular state to a hard amorphous state, suggesting that significant quantities of unreacted starting materials are present in the final product.

To be commercially viable, rumen-protected unsaturated fatty acid cattle feed supplements must be in a form acceptable to the cattle industry. Therefore, a need exists for unsaturated fatty acid calcium salts that are storage stable and easily formed into particles small enough for cattle to consume that also confer a nutritional benefit to the cattle.

A variety of unsaturated fatty acids have been identified as desirable for producing a diversity of nutritional and physiological benefits in humans and lower animals, including pets and livestock, and accordingly have attracted attention as nutritional supplements. Omega-3 fatty acids, for example, have been discovered to promote animal fertility, and have other nutritional and physiological properties as well. Conjugated Linoleic Acids (CLA's) have been discovered to possess a diverse and complex level of biological activity. Anti-carcinogenic properties have been well documented, as well as stimulation of the immune system. U.S. Pat. No. 5,914,346 discloses the use of CLA's to enhance natural killer lymphocyte function. U.S. Pat. No. 5,430,066 describes the effect of CLA's in preventing weight loss and anorexia by immune system stimulation.

CLA's have also been found to exert a profound generalized effect on body composition, in particular, upon redirecting the partitioning of fat and lean tissue mass. U.S. Pat. Nos. 5,554,646 and 6,020,378 disclose the use of CLA's for reducing body fat and increasing lean body mass. U.S. Pat. No. 5,814,663 discloses the use of CLA's to maintain an existing level of body fat or body weight in humans. U.S. Pat. No. 6,034,132 discloses the use of CLA's to reduce body weight and treat obesity in humans. CLA's are also disclosed by U.S. Pat. No. 5,804,210 to maintain or enhance bone mineral content.

It is also known that supplementing the diet of livestock with unsaturated fatty acids will alter the livestock fatty acid profile, so that, for example, feeding dairy cows and beef cattle a source of unsaturated fatty acids beneficial to humans will yield dairy and beef products for human consumption enriched with the beneficial unsaturated fatty acids. For example, U.S. Pat. No. 5,143,737 discloses that the unsaturated fat content of milk and meat from ruminant animals can be increased by incorporating the intended unsaturated fat into the diet of the ruminant.

Thus, meat and milk enriched with CLA's and other unsaturated fatty acids can be obtained by supplementing ruminant diets with unsaturated fatty acids such as CLA. Dairy cows and beef cattle fed a source of CLA not only will produce lower fat content dairy and beef products, the products will be enriched with CLA's as well. Dietary supplementation of dairy cows and beef cattle with unsaturated fatty acids beneficial to humans can also be used to displace and thereby reduce the levels of undesirable saturated fatty acids in dairy and beef products.

The beneficial effects produced by unsaturated fatty acids are not limited to CLA's. Other unsaturated fatty acids are disclosed to be useful for treating diabetes (U.S. Pat. No. 4,472,432), heart disease (U.S. Pat. Nos. 4,495,201; 5,541,225 and 5,859,055), prostaglandin deficiencies (U.S. Pat. No. 5,043,328), malaria (U.S. Pat. No. 5,604,258), osteoporosis (U.S. Pat. Nos. 5,618,558 and 5,888,541), cancer (U.S. Pat. No. 5,763,484), immune system function (U.S. Pat. No. 5,767,156), Huntington's Chorea (U.S. Pat. No. 5,837,731) and inflammation (U.S. Pat. No. 5,861,433). The disclosures of the foregoing patents are all incorporated by reference.

It has further been discovered that ruminants fed a source of trans-C18:1 fatty acids will have decreased concentrations of milk fat, hepatic triacylglycerol, and lower incidence of sub-clinical ketosis during early postpartum, and that feeding a source of linoleic (C18:2) fatty acids during the transition period will increase synthesis of $PGF_{2\alpha}$. The linoleic fatty acids thus hasten uterine involution and reduce the incidence of clinical and subclinical uterine inflammation; which translates to increased fertility. For purposes of the present invention, "trans fatty acids" are defined as trans C18:1 fatty acids.

A need exists for calcium salts of these fatty acids with acceptable storage stabilizers.

SUMMARY OF THE INVENTION

This need is met by the present invention. It has been discovered that storage stable calcium salts of unsaturated fatty acids can be produced in fine particle form either by using elevated levels of calcium oxide, or by reducing the amount of unsaturated fatty acids in the fatty acid feedstock. The preparation of such fatty acids is disclosed in co-pending and commonly-owned U.S. Pat. No. 6,559,334, the disclosure of which is incorporated herein by reference. It has also been discovered that trans fatty acids, as well C18:2 fatty acids such as conjugated linoleic acids (CLA's), depress milk fat production in ruminants.

According to one aspect of the present invention, a free-flowing unsaturated fatty acid calcium salt product is provided with a fatty acid content consisting essentially of (a) from about 40 to about 95% percent by weight of unsaturated C16–C22 fatty acids; (b) from about 5 to about 60% by weight of saturated C14–C22 fatty acids; and (c) no more than about 6% by weight of moisture, insolubles and unsaponifiables; with no more than about 20% by weight being in the form of glycerides; wherein from about 40 to about 65% by weight of the total product weight consists of trans fatty acids, and one or more fatty acids selected from C18:2 fatty acids, C18:3 fatty acids, C20–C22 omega-3 fatty acids and C20–C22 omega-6 fatty acids. C18:2 fatty acids include all CLA isomers, C18:2 omega-3 fatty acids and C18:2 omega-6 fatty acids.

Preferred trans fatty acid products according to the present invention contain between about 25 and about 55% by weight of total product weight of trans fatty acids and about 5 and about 20% by weight of the total product weight of one or more fatty acids selected from C18:2 fatty acids, C18:3 fatty acids, C20–C22 omega-3 fatty acids and C20–C22 omega-6 fatty acids.

According to another aspect of the present invention, a free-flowing unsaturated CLA calcium salt product is provided with a fatty acid content consisting essentially of (a) from about 40 to about 95% by weight of unsaturated C16–C22 fatty acids; (b) from about 5 to about 60% by weight of saturated C14–C22 fatty acids; and (c) no more than about 6% by weight of moisture and unsaponifiables; with no more than about 20% by weight being in the form of glycerides; wherein from about 10 to about 65% by weight of the total product weight consists of CLA and one or more fatty acids selected from non-conjugated C18:2 fatty acids, C18:3 fatty acids, C20–C22 omega-3 fatty acids and C20–C22 omega-6 fatty acids. The non-conjugated C18:2 fatty acids include C18:2 omega-3 fatty acids and C18:2 omega-6 fatty acids.

Preferred CLA fatty acid products according to the present invention contain between about 7.5 and about 40% by weight of the total product weight of CLA's and between about 7.5 and about 15% by weight of the total product weight of one or more fatty acids selected from non-conjugated C18:2 fatty acids, C18:3 fatty acids, C20–C22 omega-3 fatty acids and C20–C22 omega-6 fatty acids.

The present invention also includes nutritional supplements and pet food products containing the fatty acid calcium salts of the present invention.

The above and other features and advantages of the present invention will become clear from the following description of the preferred embodiment.

DETAILED DESCRIPTION OF THE PREFERRED EMBODIMENTS

The present invention employs a process by which highly unsaturated fatty acid feedstocks may be converted to free-flowing powder or granular fatty acid calcium salt rumen bypass feed supplements. The use of highly unsaturated fatty acid feedstocks represents a significant departure from conventional processes for the manufacture of fatty acid calcium salt feed supplements.

The process is employed as either a batch or a continuous process. In a typical process fatty acid feedstocks are added to a production vessel. The mixing should be accomplished in a kettle designed so that intensive and intimate contacting occurs between the calcium oxide and fat admixture so that a homogeneous dispersion of the calcium oxide particles results. Kettles may be either vertical or horizontal in configuration, and there is no need for jacketing for the purpose of heat input since the unit is operated adiabatically (no external heat input or output). The types of internal mixing elements span a wide gap but would include those with propeller, turbine, plows with chopper blades, or preferably 'Cowles-type' mixing blades as examples, but others may apply. These same devices are also be suitable for dispersing and homogenizing the water fraction into the fat admixture and calcium oxide.

Unsaturated fatty acid feedstocks are employed containing from about 40 to about 95% by weight of unsaturated C16–C22 fatty acids. The feedstocks should contain no more than about 6% by weight of moisture, insolubles and unsaponifiables and no more than about 20% by weight of the fatty acids should be in the form of glyceride. In general, unsaturated fatty acids having from 16–22 carbon atoms and from one to six double bonds are suitable for use with the present invention. The term "glyceride" as employed herein includes monoglycerides, diglycerides and triglycerides, and any mixture thereof.

Essentially, any source of unsaturated fatty acids may be employed, inclusive of fatty acid sources of animal, vegetable or marine origin and by-products thereof. This includes lard, tallow, vegetable oils such as canola oil, sunflower oil, safflower oil, cotton seed oil, canola oil, linseed oil, soybean oil, olive oil, corn oil, and the like, and byproducts thereof, as well as fish oils and byproducts thereof. Examples of marine oil sources include menhaden, herring, mackerel, caplan, tilapia, tuna, sardine, Pacific saury, krill, salmon, anchovy, skate, whale, seal, crab, shrimp, lobster, eel, mollusk, and the like. Vegetable oils also include oils derived from marine vegetation such as algae, kelp and the like. Pre-treatment processes may be needed to reduce moisture, insolubles, unsaponifiables, and glycerides below about 10% by weight. The level of glycerides, which include monoglycerides, diglycerides and triglycerides, may be reduced by hydrolysis or saponification. Examples of oil by-products include acid oils and acidulated soap stocks.

The unsaturated fatty acid feedstocks are selected on the basis of trans fatty acid and polyunsaturated fatty acid content. Fatty acid feedstocks high in trans fatty acids (about 50 weight percent and higher, and typically between about 50 and about 75 weight percent) are obtained from soybean oil using partial hydrogenation processes. Fatty acid feedstocks high in C18:2 content (about 50 weight percent and higher, and typically between about 50 and about 75 weight percent) are obtained from safflower oil, also using partial hydrogenation processes. Omega-3 and omega-6 fatty acids are typically obtained from marine and vegetable oil sources. C18:3 fatty acids are typically obtained from vegetable oil sources. Any appropriate source of either or both fatty acids may be used with the invention.

Partial hydrogenation processes produce oils with high trans fatty acid and polyunsaturated fatty acid contents. Some untreated oil sources also have high C18:2, C18:3, omega-3 and omega-6 fatty acid contents. Fatty acid calcium salts according to the present invention may be produced from such oils by diluting the oils with a neutral oil source such as palm fatty acid distillate (PFAD).

When the amount of calcium oxide falls below 1.75 equivalents relative to the amount of fatty acid, the amount of saturated fatty acids in the feedstock must be at a level of 25% by weight or greater. Feedstocks having less than 25% by weight of saturated fatty acids must be blended with another fatty acid feedstock having greater than 25% by weight of saturated fatty acids in an amount effective to produce at least 25% by weight of saturated fatty acids in the resulting admixture. A preferred source of saturated fatty acids is PFAD. The fatty acid feedstock with higher levels of saturated fatty acids can be present in a blend at a level up to about 5 and about 60% by weight, and preferably between about 5 and about 30% by weight. Such blends can be reacted with greater than 1.75 equivalents of calcium oxide, although such calcium oxide levels are not necessary to produce a commercially acceptable product when saturated fatty acid levels exceed 25% by weight.

Saturated fatty acids have higher melting points than unsaturated fatty acids. Accordingly, it may be necessary to heat the unsaturated fatty acid feedstock to form a uniform, liquid admixture with the second fatty acid feedstock having a combined saturated fatty acid content of 25% by weight or greater. A temperature up to about 80° C. is suitable, with a temperature between about 50 and about 60° C. being preferred. Additional heat is unnecessary for the hydrolysis reaction to occur.

Calcium oxide is added to the fatty acid feedstock in the range of from about 1.0 to about 2.5 equivalents relative to the fatty acid feedstock. A calcium oxide level above about 1.4 equivalents is preferred, with about 1.75 equivalents being more preferred, so that highly unsaturated fatty acid feedstocks may be employed. A calcium oxide level between about 2.0 and 2.3 equivalents is most preferred.

Water is then added to hydrate the calcium oxide to its hydroxide form, creating a large amount of exothermic heat. The heat that is evolved is sufficient for the fatty acid neutralization reaction to proceed to completion, so that it is not necessary to supply heat to the reaction mixture from external sources from this point forward. Between about two and about five equivalents of water relative to the calcium oxide is added to the reaction mixture, with between about 2.5 and about 3.5 equivalents being preferred. Calcium hydroxide may be substituted for equivalent quantities of calcium oxide and water. The excess water is converted to steam by the exothermic heat generated, which boils off rapidly. The reaction can be performed under atmospheric pressure, or under vacuum to draw off the steam.

The amount of time required for the reaction is typically between about 5 and about 60 minutes, and more typically between about 6 and about 10 minutes. The reaction is easily identified by the transformation of the admixture into a solid granular mass. Upon further agitation, the mass further transforms into a free-flowing granular material, which, upon transfer from the reaction vessel, can easily be processed into free-flowing particles.

The calcium salt product of the present invention can also be prepared from higher glyceride content fatty acid feedstocks by the saponification processes disclosed by co-pending and commonly owned U.S. patent application Ser. No. 10/716,292 filed Nov. 18, 2003, the disclosure of which is incorporated herein by reference.

Products according to one aspect of the present invention will contain from about 40 to about 65% by weight based on total product weight of trans fatty acids and one or more fatty acids selected from C18:2 fatty acids, C18:3 fatty acids, C20–C22 omega-3 fatty acids and C20–C22 omega-6 fatty acids. Particularly preferred products have a total fatty acid content of about 80 to about 85 weight percent based on total product weight. The trans fatty acids are present in an amount between about 25 and about 55 weight percent based on total product weight in combination with between about 5 and about 20 weight percent based on total product weight of one or more fatty acids selected from C18:2 fatty acids, C18:3 fatty acids, C20–C22 omega-3 fatty acids and C20–C22 omega-6 fatty acids. A trans fatty acid content between about 30 and about 50 weight percent based on total product weight is more preferred, with the content between 35 and about 45 weight percent based on total product weight most preferred.

Products according to another aspect of the present invention will contain from about 10 to about 40% by weight of total product weight CLA's and one or more fatty acids selected from non-conjugated C18:2 fatty acids, C18:3 fatty acids, C20–C22 omega-3 fatty acids and C20–C22 omega-6 fatty acids. Particularly preferred products also have a total fatty acid content of about 80 to about 85 weight percent based on total product weight. Between about 7.5 and about 15 weight percent based on total product weight of one or more fatty acids selected from C18:2 fatty acids, C18:3 fatty acids, C20–C22 omega-3 fatty acids and C20–C22 omega-6 fatty acid is preferred, with between about 10 and about 12.5 weight percent based on total product weight being more preferred. The preferred amount of CLA's is also between about 7.5 and about 15 weight percent based on total product weight, with between about 10 and about 12.5 weight percent based on total product weight being more preferred.

Preferred CLA isomers include the 10,12 and 9,11 isomers, specific examples of which include the trans 10, trans 12; trans 10, cis 12; cis 10, trans 12; cis 10, cis 12; trans 9, trans 11; trans 9, cis 11; cis 9, trans 11 and cis 9, cis 11 isomers. Trans fatty acids isomers having utility as dietary supplements for livestock include C18:1 isomers such as trans-9-octadecenoic acid.

Preferred omega-3 fatty acids include eicosapentaenoic acid (EPA), docosahexaenoic acid (DHA) and linolenic acid (LNA). Preferred omega-6 fatty acids include arachidonic acid and linoleic acid.

A biologically active material can be included as an optional ingredient in the invention process. By the term "biologically active material", it is meant any substance capable of being administered orally in a feed composition. Preferred biologically active materials are susceptible to inactivation in the rumen by microbes and digestive juices, and are thereby protected therefrom by incorporation into the fatty acid calcium salts of the present invention. The biologically active material can be selected from a broad variety of nutrients and medicaments, either as a single component or as a mixture of components, which are illustrated by the following list of active molecular species:

1. Sugars and complex carbohydrates which include both water-soluble and water insoluble monosaccharides, disaccharides and polysaccharides. Particularly preferred carbohydrates include cane molasses and sugar beet byproducts.

2. Amino acid ingredients, either singly or in combination, which include arginine, histidine, isoleucine, leucine, lysine, methionine, phenylalanine, threonine, tryptophan, valine, tyrosine ethyl HCl, alanine, aspartic acid, glutamic acid, sodium glutamate, potassium glutamate, glycine, proline, serine, cystine ethyl HCl, and the like; and analogues and salts thereof.

3. Vitamin ingredients, either singly or in combination, including thiamine HCl, riboflavin, pyridoxine HCl, niacin, inositol, choline chloride, calcium pantothenate, biotin, folic acid, ascorbic acid, Vitamin B, p-aminobenzoic acid, Vitamin A acetate, Vitamin K, Vitamin B, Vitamin E, and the like.

4. Trace element ingredients, either singly or in combination, including compounds of cobalt, copper, manganese, iron, zinc, tin, nickel, chromium, molybdenum, iodine, chlorine, silicon, vanadium, selenium, calcium, magnesium, sodium and potassium 5. Protein ingredients obtained from sources such as cottonseed meal, soybean meal, rapeseed meal, sunflower seed meal, canola meal, safflower meal, dehydrated alfalfa, corn gluten meal, soybean protein concentrate, potato protein, fish meal, fish and poultry protein isolates, crab protein concentrate, liquid or powdered egg, milk whey, egg albumen, casein, fish solubles, cell cream, brewer's residues, and the like.

6. Medicament ingredients, either singly or in combination, including promazine hydrochloride, chloromedoniate acetate, chlorotetracycline, sulfamethazine, monensin, sodium monensin, poloxalme, oxytetracycline, BOVATEC, and the like.

7. Antioxidants, including butylated hydroxyanisole, butylated hydroxytoluene, tertiarybutylhydroquinone, tocopherols, propyl gallate and ethoxyquin; and preservatives, including sodium sorbate, potassium sorbate, sodium benzoate, propionic acid, $\alpha$-hydroxybutenic acid, and the like.

The biologically active material is present at a level up to about 20% by weight relative to the fatty acid.

The unsaturated fatty acid calcium salt rumen bypass feed supplements of the present invention may be conveniently fed to a ruminant admixed with a conventional ruminant feed. The feeds are typically vegetable materials edible by ruminants, such as legume hay, grass hay, corn silage, grass silage, legume silage, corn grain, oats, barley, distiller's grain, brewer's grain, soya bean meal and cottonseed meal. There is no particular lower limit of the calcium salt to be added to the ruminant feed, although in practice, amounts of the calcium salt below about 0.2% of the dry solids content of the feed are too small to provide significant benefits.

While the calcium salts of the present invention can be used as rumen-inert feed supplements for ruminants such as cattle, the calcium salts are also useful in general as a nutritional supplement for humans and other mammals, including companion animals such as dogs and cats, and non-mammals, including birds and fishes. The beneficial unsaturated fatty acid calcium salt nutritional supplements can also be fed to livestock to produce meat, poultry and dairy products enriched with the calcium salt fatty acids.

Because the calcium salts of the present invention can be used as nutritional supplements for humans, other mammals, and non-mammals, including birds and fish. Thus, methods in accordance with the present invention add an effective amount of the unsaturated fatty acid calcium salts of the present invention to a food product including companion animal food products such as cat food and dog food. Effective amounts include amounts that will provide a food product having a beneficial unsaturated fatty acid content between about 0.05 and about 1.5 weight percent. A beneficial unsaturated fatty acid content between about 0.1 weight percent and about 0.5 weight percent is preferred. "Beneficial" unsaturated fatty acids are defined as the unsaturated fatty acids of the present invention that have a nutritional or therapeutic effect upon the animal intended to consume the product. For example, trans fatty acids are beneficial to ruminants, but not humans. Therefore, the present invention includes feed supplements for ruminants containing trans fatty acids, but nutritional supplements intended for humans would not contain trans fatty acids.

The present invention thus also includes food products containing the beneficial unsaturated fatty acid calcium salts of the present invention within the ranges described, including companion animal food products such as cat food and dog food. The cat foods and dog foods include dry, semi-moist and moist cat food and dog food prepared by otherwise conventional methods from conventional formulations incorporating conventional pet food ingredients.

The omega-3 fatty acid calcium salts of the present invention, and particularly those containing one or more omega-3 fatty acids selected from DHA, EPA and LNA can be used in the fertility enhancement methods disclosed by U.S. Pat. No. 6,576,667, which is incorporated herein by reference.

The following non-limiting example illustrates certain aspects of the invention. All parts and percentages are by weight, and all temperatures are in degrees Celsius.

EXAMPLE 13.8 pounds of calcium oxide was added to a vertical mixer with Cowles-type mixing blades containing 78.2 pounds of a mixture of free fatty acids from a combination of soybean oil (hydrogenated to provide a trans fatty acid content of 60 weight percent) blended with safflower oil. The respective amounts of the two oils were selected to provide 60 percent total product weight of trans fatty acid and C18:2 fatty acid in a 70:30 ratio of trans fatty acid C18:1 to C18:2 fatty acid. The oils had by concentration 95% by weight free fatty acid. The total unsaturated fatty acid content was 90% by weight. Prior to adding the calcium oxide, the oil blend was heated to a temperature of 60° C. After the calcium oxide was uniformly dispersed, 10.8 pounds of water was added, and the temperature of the mixture rose to 120° C. Agitation continued until a uniform, homogenous mixture was obtained, which was dumped from the vessel into a tray, in which the reaction went to completion and the product cooled. Milling of the finished product produced a free-flowing granule that was not dusty having a total fat content of about 83% by weight.

The present invention thus provides a method by which rumen-protected fatty acid calcium salts high in unsaturated fatty acid content may be prepared in a form familiar to and accepted by the dairy and cattle industry for supplementation of cattle diets to improve cow fertility. The foregoing examples and description of the preferred embodiment should be taken as illustrating, rather than as limiting, the present invention as defined by the claims. As will be readily appreciated, numerous variations and combinations of the features set forth above can be utilized without departing from the present invention as set forth in the claims. Such variations are not regarded as a departure from the spirit and scope of the invention, and all such modifications are intended to be included within the scope of the following claims.

What is claimed is:

1. A free-flowing unsaturated fatty acid calcium salt comprising a fatty acid content consisting essentially of (a) from about 40 to about 95% percent by weight of unsaturated C16–C22 fatty acids; (b) from about 5 to about 60% by weight of saturated C14–C22 fatty acids; and (c) no more than about 6% by weight of moisture, insolubles and unsaponifiables; with no more than about 20% by weight being in the form of glycerides; wherein from about 40 to about 65% by weight of the total product weight consists of trans fatty acids and one or more fatty acids selected from the group consisting of C18:2 fatty acids, C18:3 fatty acids, C20–22 omega-3 fatty acids and C20–22 omega-6 fatty acids.

2. The fatty acid calcium salt of claim 1, wherein said trans fatty acids are present in an amount between about 25 and about 55% by weight of the total product weight.

3. The fatty acid calcium salt of claim 1, comprising from about 5 to about 20% by weight of 1 or more fatty acids selected from the group consisting of C18:2 fatty acids, C18:3 fatty acids, C20–C22 omega-3 fatty acids, and C20–C22 omega-6 fatty acids.

4. The fatty acid calcium salt of claim 1, comprising one or more C18:2 fatty acids selected from the group consisting of CLA's, C18:2 omega-3 fatty acids and C18:2 omega-6 fatty acids.

5. The fatty acid calcium salt of claim 1, comprising either or both DHA and EPA.

6. The fatty acid calcium salt of claim 1, comprising one or more C18:3 fatty acids.

7. The fatty acid calcium salt of claim 1, comprising one or more omega-6 fatty acids.

8. The fatty acid calcium salt of claim 1, comprising from about 0.1 to about 1.5 equivalents of calcium hydroxide relative to the fatty acid content.

9. A nutritional supplement composition comprising the fatty acid calcium salt of claim 1.

10. A pet food product comprising the fatty acid calcium salt of claim 1.

11. A free-flowing unsaturated fatty acid calcium salt comprising a fatty acid content consisting essentially of (a) from about 40 to about 95% by weight of unsaturated C16–C22 fatty acids; (b) from about 5 to about 60% by weight of saturated C14–C22 fatty acids; and (c) no more than about 6% by weight of moisture, insolubles and unsaponifiables; with no more than about 20% by weight being in the form of glycerides; wherein from about 10 to about 65% by weight of the total product weight consists of CLA's and one or more fatty acids selected from the group consisting of non-conjugated C18:2 fatty acids, C18:3 fatty acids, C20–C22 omega-3 fatty acids and C20–C22 omega-6 fatty acids.

12. The fatty acid calcium salt of claim 11, wherein said CLA's are present in an amount between 7.5 and about 40% by weight of the total product weight.

13. The fatty acid calcium salt of claim 11, comprising between about 7.5 and about 15% by weight of one or more fatty acids selected from the group consisting of non-conjugated C18:2 fatty acids, C18:3 fatty acids, C20–C22 omega-3 fatty acids and C20–C22 omega-6 fatty acids.

14. The fatty acid calcium salt of claim 11, comprising one or more non-conjugated C18:2 fatty acids selected from the group consisting of C18:2 omega-3 fatty acids and C18:2 omega-6 fatty acids.

15. The fatty acid calcium salt of claim 11, comprising either of both DHA and EPA.

16. The fatty acid calcium salt of claim 11, comprising one or more C18:3 fatty acids.

17. The fatty acid calcium salt of claim 11, comprising one or more omega-6 fatty acids.

18. The fatty acid calcium salt of claim 11, comprising from about 0.1 to about 1.5 equivalents of calcium hydroxide relative to the fatty acid content.

19. A nutritional supplement composition comprising the fatty acid calcium salt of claim 11.

20. The nutritional supplement composition of claim 19, characterized in that said supplement is intended for human consumption.

21. A pet food product comprising the fatty acid calcium salt of claim 11.

* * * * *